US005962804A

United States Patent [19]

Lee

[11] Patent Number: 5,962,804

[45] Date of Patent: Oct. 5, 1999

[54] ACTUATING DEVICE OF A DYNAMITE GUN

[76] Inventor: Cheng-Ho Lee, No. 74, Paokao Rd., Hsintien City, Taipei Hsien, Taiwan

[21] Appl. No.: 09/097,393

[22] Filed: Jun. 16, 1998

[51] Int. Cl.[6] .............................. B64D 1/04; F41A 19/00; F41A 17/00; B21J 15/28

[52] U.S. Cl. ............................ 89/1.14; 42/69.01; 89/132; 124/40; 227/8

[58] Field of Search ................................ 42/69.01, 69.02, 42/70.08; 89/132, 139; 124/31, 40; 227/8

[56] References Cited

U.S. PATENT DOCUMENTS

| | | | |
|---|---|---|---|
| 2,042,934 | 6/1936 | Gill | 42/2 |
| 2,925,604 | 2/1960 | Kopf et al. | 228/8 |
| 2,957,176 | 10/1960 | Henning et al. | 228/8 |
| 2,966,683 | 1/1961 | Schulz | 228/8 |
| 2,968,811 | 1/1961 | Henning et al. | 228/8 |
| 2,977,598 | 4/1961 | Broughton | 228/8 |
| 3,005,202 | 10/1961 | Kvavle | 228/8 |
| 4,061,261 | 12/1977 | Fredriksson et al. | 228/8 |

*Primary Examiner*—Charles T. Jordan
*Assistant Examiner*—Jeffrey Howell
*Attorney, Agent, or Firm*—Rosenberg, Klein & Bilker

[57] ABSTRACT

An actuating device for a dynamite gun includes a barrel member having a first tube slidably mounted to a second tube which is fixedly connected to the barrel member, a bar removably received in the second tube. The first tube has a first slot and a first enlarged hole, and the second tube has a second slot and a second enlarged hole, wherein the second slot is wider than the first slot. A function rod is movably received in a stepped hole defined transversely in the bar and has three sections with different outer diameters so as to extend through the first and the second slot. An actuating member pivotally disposed to the gun and has a recess defined in a top thereof so that if the actuating member is operated before the first tube is pushed rearwardly, the lower end of the function rod will be received in the recess and the gun does not function.

7 Claims, 8 Drawing Sheets

ACTUATING DEVICE OF A DYNAMITE GUN

FIELD OF THE INVENTION

The present invention relates to an actuating device, and more particularly, to a safety actuating device of a dynamite gun wherein the dynamite in the gun will not be actuated even if the trigger of the actuating device is pulled before a recognition tube is retracted into the gun.

BACKGROUND OF THE INVENTION

Dynamite guns are used to powerfully penetrate a nail or the like into a tough surface such as a wall surface, such the dynamite gun includes an actuating device with a trigger disposed to the gun so that when pulling the trigger, a packet of dynamite is actuated to generate a large thrust to send a nail into the wall. It is relatively dangerous if the dynamite gun is operated in an improper manner, such as to aim at people, so a recognition tube is developed and disposed in the gun to prevent the actuation of the dynamite without properly operating the recognition tube. To properly operate the dynamite gun, the recognition tube has to be pushed against the surface to be penetrated before pulling the trigger. However, if a user pulls the trigger when he/she holds the gun before the recognition tube is depressed into the gun, a dangerous result could still happen.

The present invention intends to provide an actuating device for a dynamite gun such that the gun will not operate even if the trigger thereof is pulled before the recognition tube is depressed into the gun. By the structure of the present invention, the disadvantages of the conventional dynamite gun can be mitigated and/or obviated.

SUMMARY OF THE INVENTION

In accordance with one aspect of the present invention, there is provided an actuating device of a dynamite gun, comprising a barrel member having a rear end with an aperture defined therethrough and at least one pushing rod retractably extending from the rear end of the barrel member.

A first tube has an end removably contacting the rear end of the barrel member and at least one lug extends radially and outwardly from the first end of the first tube. The first tube has a first slot and a first enlarged hole defined through a peripheral wall thereof wherein the first slot communicates with the first enlarged hole. A second tube has an end engaged with the rear end of the barrel member with the first tube slidably mounted to the second tube which has a second slot and second enlarged hole respectively defined through a peripheral wall thereof.

A bar is movably received in the second tube and has a firing pin extending from a first thereof. A first spring is biasedly received in a second end of the bar so as to press the bar toward the barrel member and a stepped hole is defined laterally through the bar. A main spring is mounted to the second tube and has one of two ends thereof contacting against the first tube. The first spring and the main spring both contact against an inner end of the dynamite gun.

A function rod is movably received in the stepped hole and has a first section, a second section and a third section, wherein the outer diameter of the first section is larger than the width of the second slot and the inner diameter of the second enlarged hole, the width of the second slot is larger than the outer diameter of the second section, the outer diameter of the second section is larger than the width of the first slot, and the width of the first slot is larger than the outer diameter of the third section. The second section extends through the first enlarged hole and the second slot when the pushing rod is completely received in the barrel tube.

An actuating member is pivotally disposed below the second tube and includes a vertical portion and a horizontal portion. The horizontal portion has a first recess and a second recess respectively defined in the top thereof and separated by a protrusion. The third section is pushed upward by the horizontal portion when the vertical portion is pushed toward the function rod.

It is an object of the present invention to provide an actuating device of a dynamite gun such that the gun will not function even if an actuating member is operated before a pushing rod is pushed rearwardly.

Further features of the present invention will become apparent after a careful reading of the detailed description with appropriate reference to the accompanying drawings.

DETAILED DESCRIPTION OF THE PREFERRED EMBODIMENT

Figure 1:
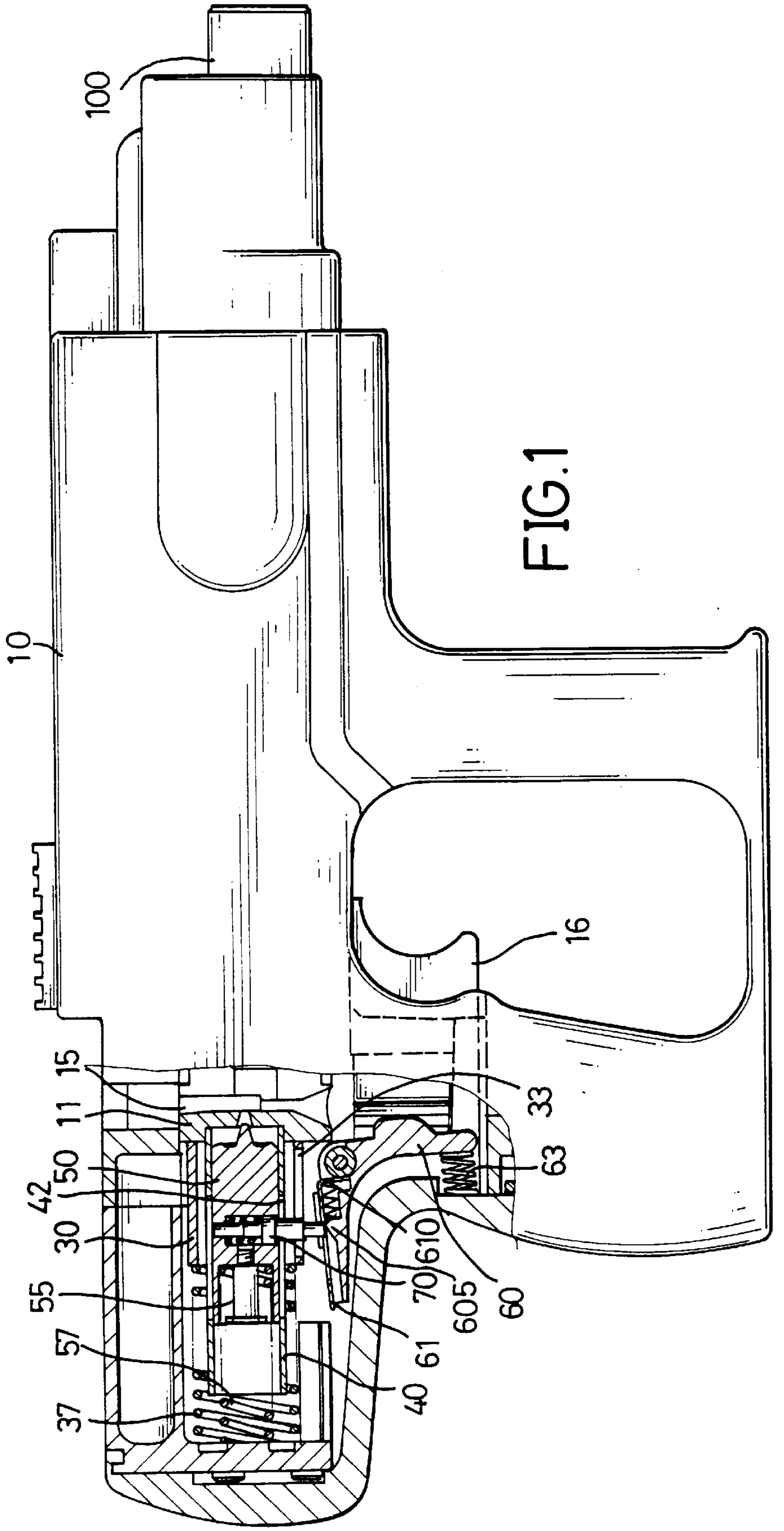
FIG. 1 is a side elevational view, partly in section, of a dynamite gun, wherein an actuating device in accordance with the present invention is shown by removing a part of the gun.
Figure 2:
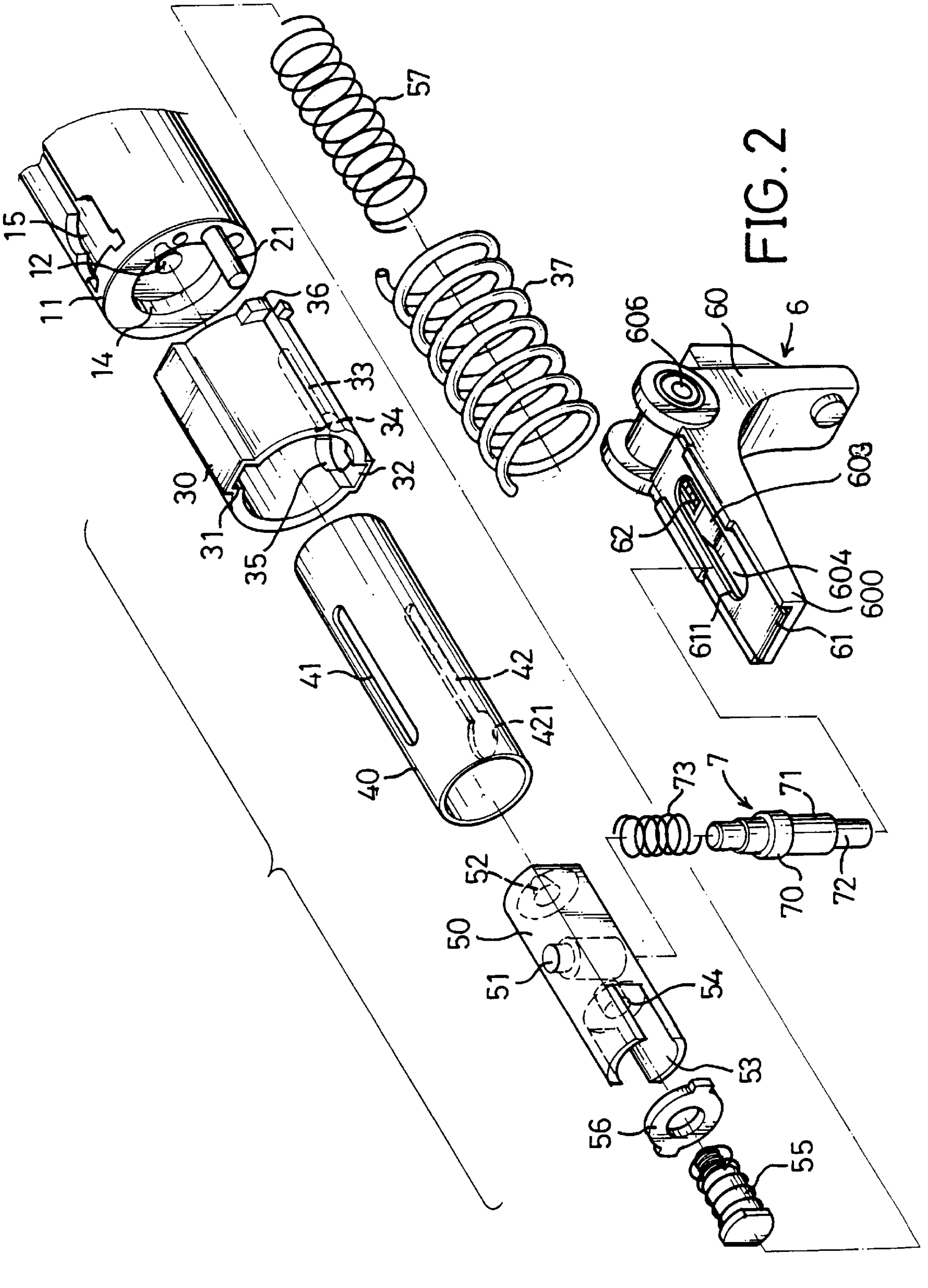
FIG. 2 is an exploded view of the actuating device in accordance with the present invention.

Referring to FIGS. 1 and 2, the actuating device of the present invention is disposed in a dynamite gun 10 and comprises a barrel member 11 having a rear end with an aperture 12 defined therethrough and at least one pushing rod 21 retractably extending from the rear end of the barrel member 11, wherein the pushing rod 21 is connected to a recognition tube 100 which extends from a front end of the dynamite gun 10 so that when the recognition tube 100 pushes against a wall or object, the pushing rod 21 is pushed rearwardly and extends from the rear end of the barrel member 11. The barrel member 11 further has a recessed portion 14 defined in the rear end thereof and an entrance hole 15 defined through a peripheral wall thereof so that dynamite packets (not shown) are received in a chamber defined in the barrel member 11 and communicating with the aperture 12.

A first tube 30 has an end removably contacting the rear end of the barrel member 11 and at least one lug 36 extending radially and outwardly from the end thereof. The lug 36 is aligned to the pushing rod 21. The first tube 30 has a first slot 33 and a first enlarged hole 35 defined through a peripheral wall thereof wherein the first slot 33 communicates with the first enlarged hole 35. A shoulder portion 34 is defined between the first enlarged hole 35 and the first slot 33. The first tube 30 further has a first inner groove 31 and a second inner groove 32 respectively defined in the inner periphery thereof, the second inner groove 32 being located to communicate with the first slot 33 and the first enlarged hole 35.

A second tube 40 has an end received in the recessed portion 14 of the rear end of the barrel member 11 and the first tube 30 is slidably mounted to the second tube 40. The second tube 40 has a second slot 42 and second enlarged hole 421 respectively defined through a peripheral wall thereof, wherein the second enlarged hole 421 communicates with the second slot 42. A third slot 41 is defined through the peripheral wall of the second tube 40 and located diametrically opposite to the second slot 42. When the first tube 30 is movably mounted to the second tube 40, the second slot 42 communicates with the first slot 33 and the third slot 41 communicates with the first inner groove 31.

A bar 50 is removably received in the second tube 40 and has a firing pin 52 extending from a first end thereof, the firing pin 52 is inserted into the aperture 12 to ignite the dynamite packs. The bar 50 has two plates 53 extending separately from a second end thereof which has a threaded hole 54 defined therein so that a washer 56 with two lugs is received between the two plates 53 and a member 55 with a spring mounted thereto extends through the washer 56 and threads into the threaded hole 54. A first spring 57 is biasedly received between the second end of the bar 50 and the inner end of the dynamite gun 10. A stepped hole 51 is formed laterally through the bar 50. A main spring 37 is mounted to the second tube 40 having one end contacting the first tube 30 and the other end contacting the inner end of the dynamite gun 10.

A function rod 7 is movably received in the stepped hole 51 and has a first section 70, a second section 71 and a third section 72, wherein the outer diameter of the first section 70 is larger than the width of the second slot 42 and the inner diameter of the second enlarged hole 421, the width of the second slot 42 is larger than the outer diameter of the second section 71, the outer diameter of the second section 71 is larger than the width of the first slot 33, and the width of the first slot 33 is larger than the outer diameter of the third section 72. The second section 71 extends through the first enlarged hole 35 and the second slot 42 when the pushing rod 21 is completely received in the barrel tube 11, and the first section 70 is limited by a periphery defining the second enlarged hole 421. A spring 73 is retained in the stepped hole 51 and mounted to the function rod 7 so as to push the function rod 7 toward an actuating member 6 which will be described hereinafter.

The actuating member 6 is pivotally disposed about a pivot 606 below the second tube 40 and includes a vertical portion 60 and a horizontal portion 600. The vertical portion 60 is connected with the trigger 16 of the dynamite gun 10 so that when pulling the trigger 16, the vertical portion 60 is pushed and the actuating member 6 is pivoted about the pivot 606. The vertical portion 60 of the actuating member 6 is biased by a return spring 63 to push the vertical portion 60 in a direction away from the horizontal portion 600. The horizontal portion 600 has a first recess 604 and a second recess 602 (FIG. 8) respectively defined in a top thereof and separated by a protrusion 605 which has an inclined surface 603 defined in one of two sides thereof. A sliding plate 61 is movably disposed to the top of the horizontal portion 600 and has an elongate hole 611 defined therethrough which communicates with the first recess 604. The sliding plate 61 has a tongue 610 extending perpendicularly from one of two ends thereof so that a second spring 62 is biased between the protrusion 605 and the tongue 610.

Figure 3:
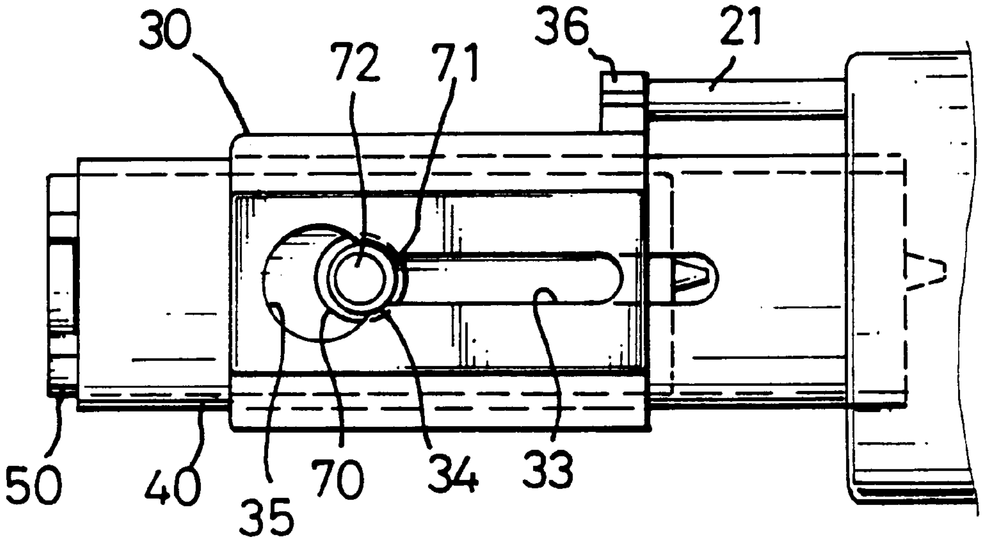
FIG. 3 is an illustrative view to show an arrangement of the function rod, the first tube and the second tube of the actuating device when the pushing rod is pushed rearwardly.
Figure 4:
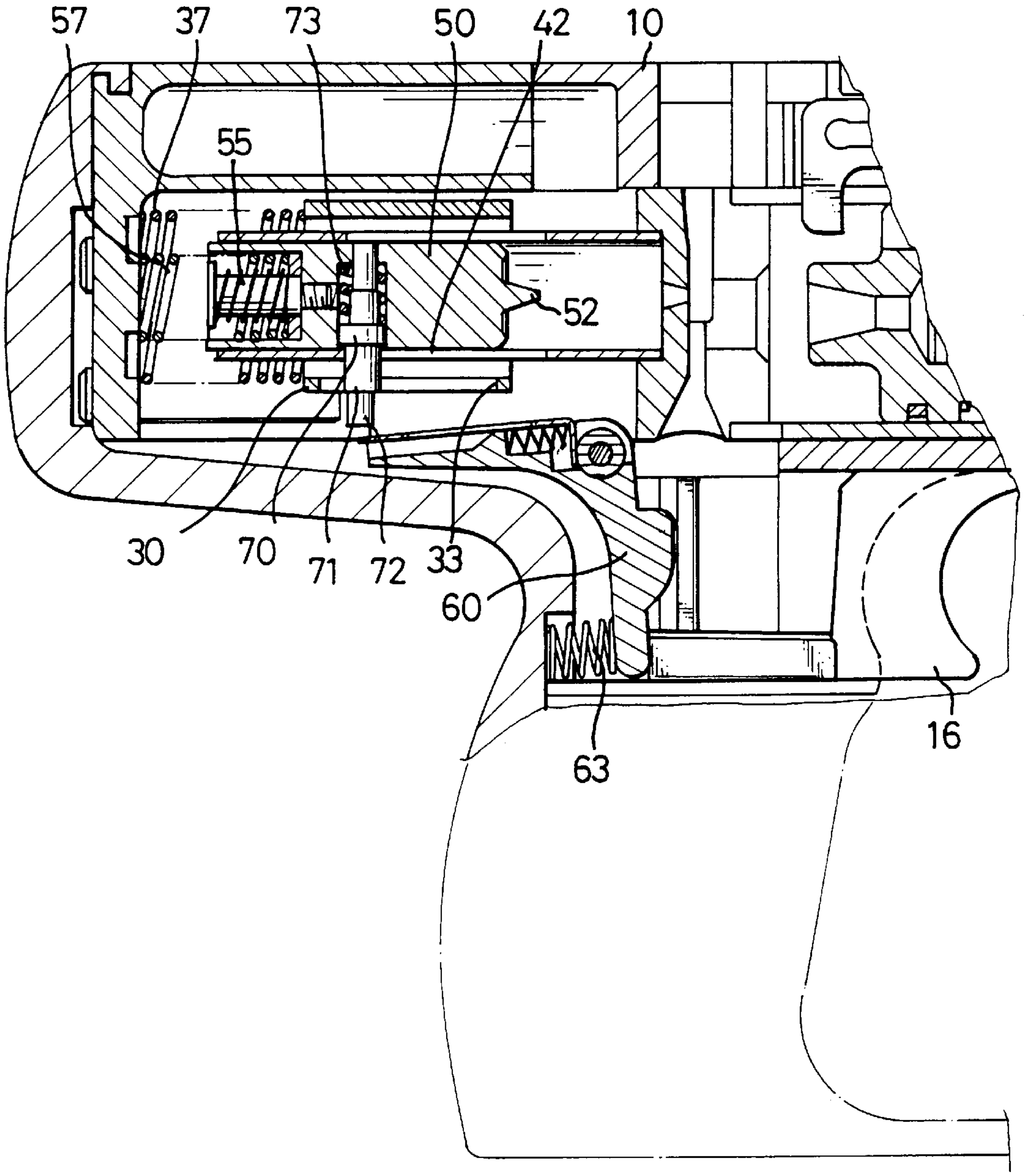
FIG. 4 is a side elevational view, partly in section, of the arrangement as shown in FIG. 3.

When using the dynamite gun 10, referring to FIGS. 3 and 4, the recognition tube 100 is firstly pushed against an object and a wall to extend the pushing rod 21 out from the rear end of the barrel member 11 so as to push the first tube 30 rearwardly. During the movement of the first tube 30, the second section 71 of the function rod 7 is engaged with the shoulder portion 34 as shown in FIG. 3 and moved with the first tube 30 to press the main spring 37 and the first spring 57.

Figure 5:
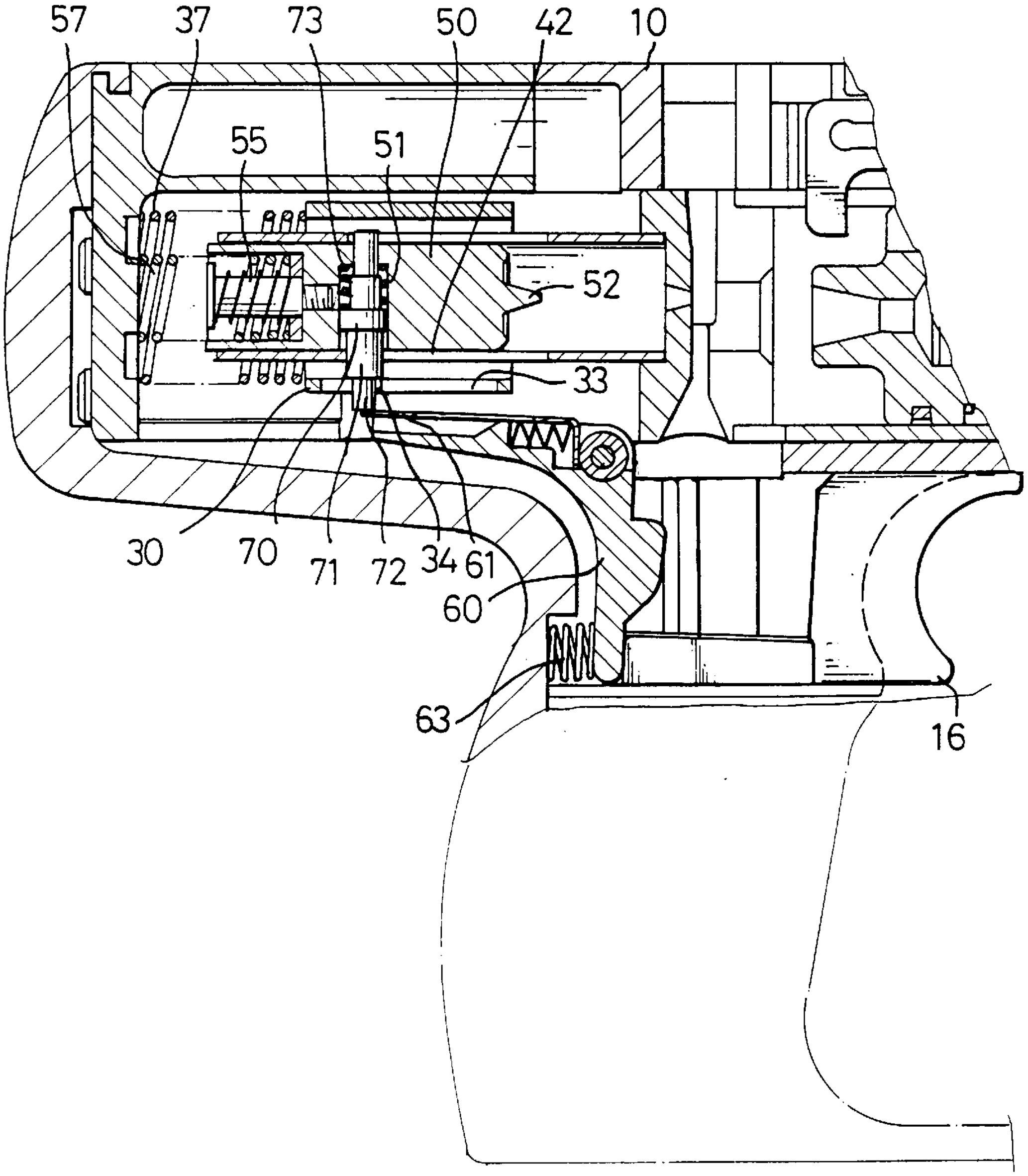
FIG. 5 is a side elevational view, partly in section, of the actuating device when an actuating member is pivoted to push the function rod upwardly.
Figure 6:
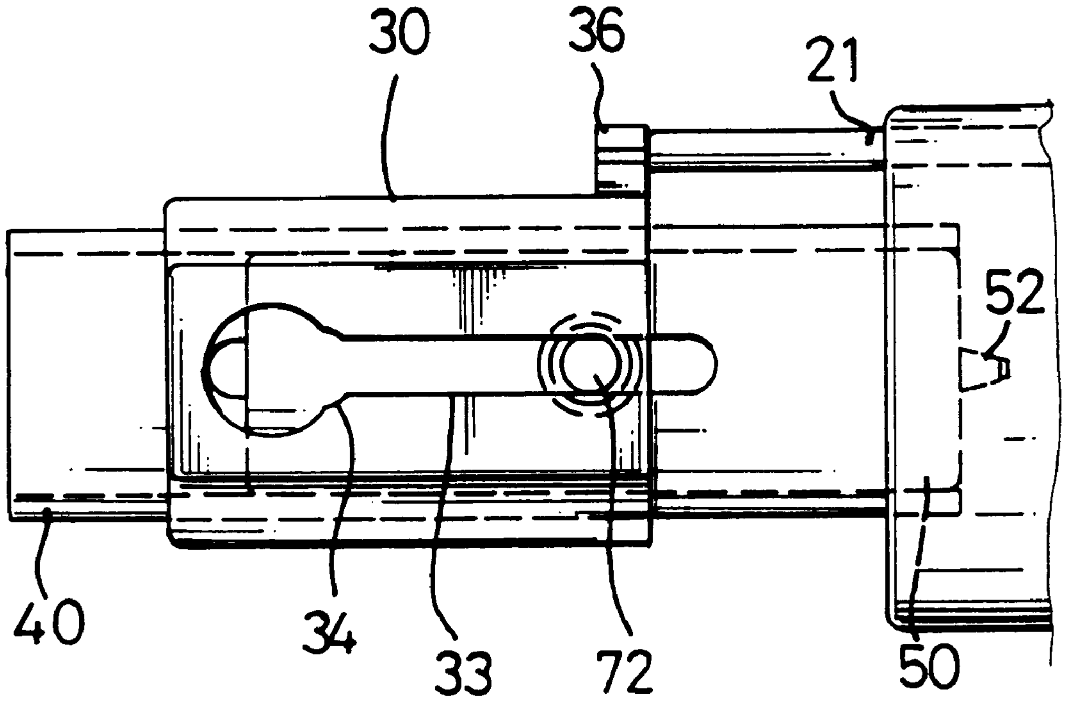
FIG. 6 is an illustrative view to show the function rod is moved within a first slot of the first tube when the actuating member is pivoted.
Figure 7:
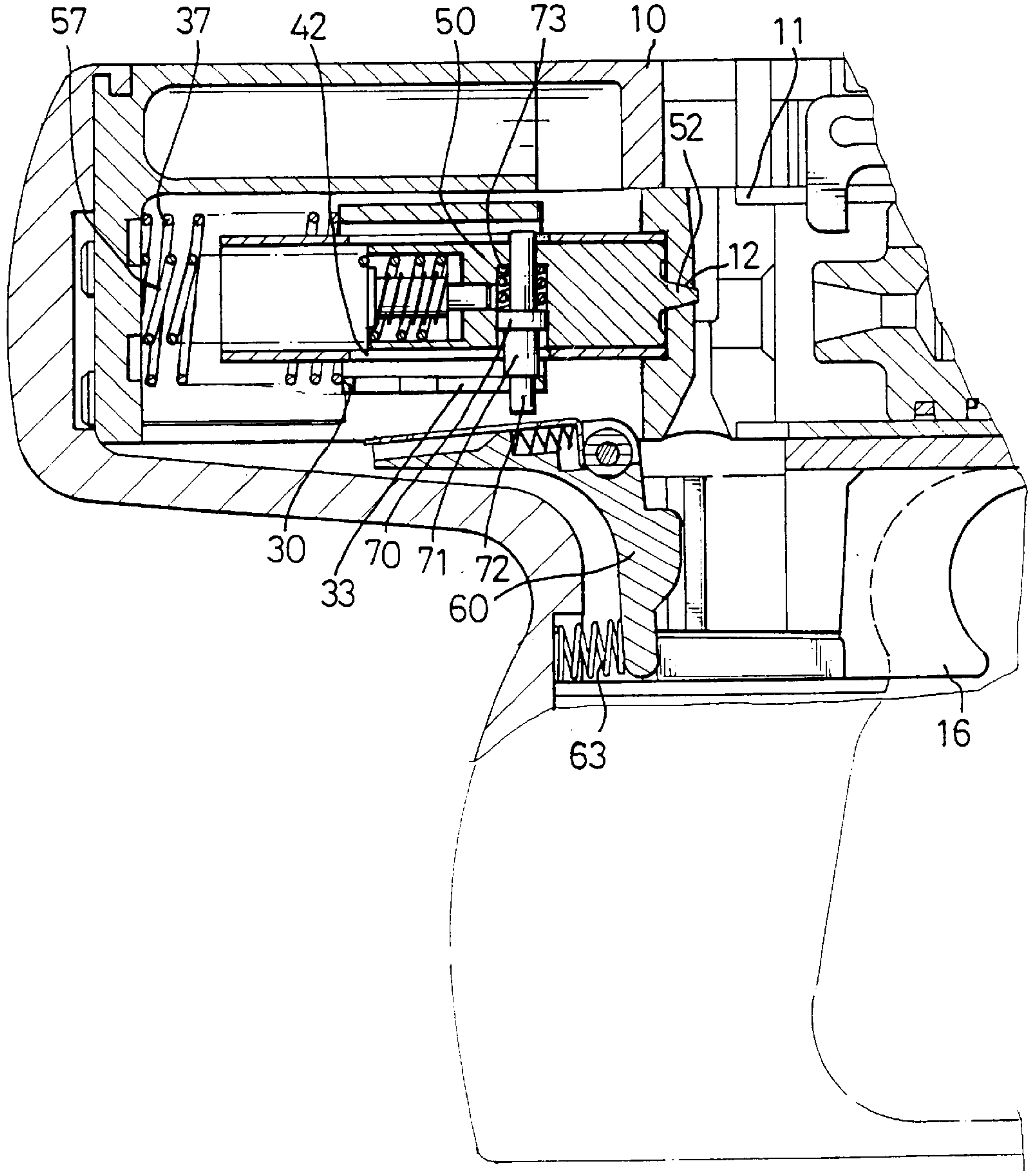
FIG. 7 is a side elevational view, partly in section, of the actuating device when the function rod is moved to an end of the first slot of the first tube.

Referring to FIGS. 5 through 7, when pulling the trigger 16 to pivot the actuating member 6 about the pivot 605 as shown in FIG. 6, the third section 72 is pushed upwardly by the horizontal portion 600 so that the second section 71 is pushed to disengage from the shoulder portion 34, the function rod 7 is then moved by the first spring 57 with the third section 72 moving in the first slot 33 till the firing pin 52 extends into the aperture 12 to ignite the dynamite packs as shown in FIG. 7. In the meanwhile, a top of the function rod 7 is pushed through the third slot 41 and moved in the first inner groove 31. When removing the recognition tube 100 from the object or the wall, the first tube 30 is then pushed by the main spring 37 to return to the original position as shown in FIG. 1.

Figure 8:
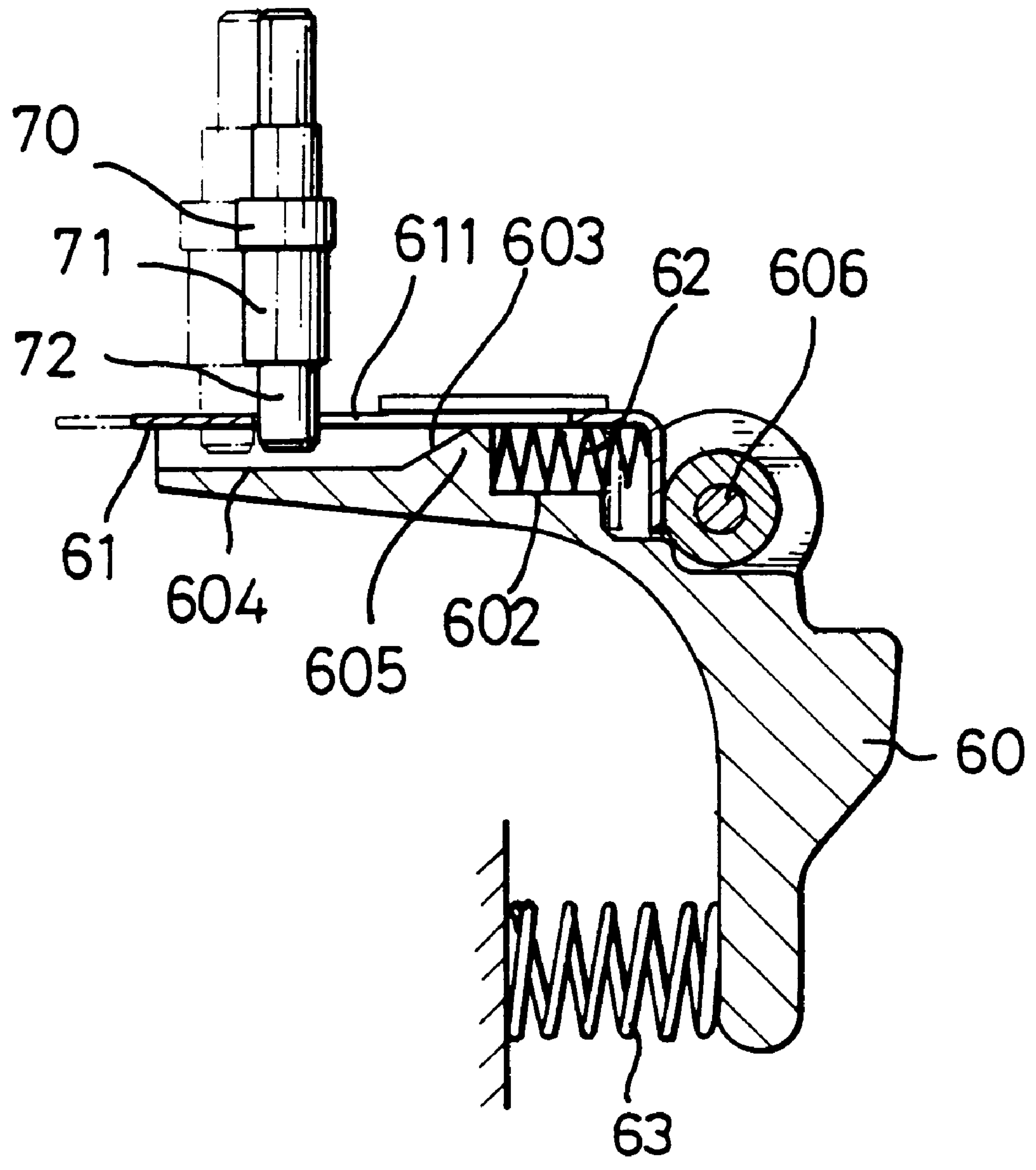
FIG. 8 is an illustrative view to show a third section of the function rod is received in the recess of the actuating member if the actuating member is operated before the pushing rod is pushed rearwardly.

If the trigger 16 is pulled before the recognition tube 100 is pushed rearwardly, that is to say, when the function rod 7 is located at a position shown in FIG. 1, the third section 72 of the function rod 7 is pushed by the inclined surface 603 of the protrusion 605, because the bar 50 is not pulled rearwardly so that no ignition action will happen. Referring to FIG. 8, if the trigger 16 is pulled first and then the recognition tube 100 is pushed rearwardly, the third section 72 of the function rod 7 will be moved with the first tube 30 and drops into the first recess 604. The movement of the third section 72 is limited by the elongate hole 611 so that the first tube 30 cannot be pushed normally as shown in FIG. 5 so as to prevent igniting the dynamite packets.

It should be clear to those skilled in the art that further embodiments may be made without departing from the scope and spirit of the present invention.

What is claimed is:

1. An actuating device of a dynamite gun, comprising:

a barrel member having a rear end with an aperture defined therethrough and at least one pushing rod retractably extending from said rear end of said barrel member;

a first tube having an end removably contacting said rear end of said barrel member and at least one lug extending radially and outwardly from said end of said first tube, said first tube having a first slot and a first enlarged hole defined through a peripheral wall thereof wherein said first slot communicates with said first enlarged hole;

a second tube having an end engaged with said rear end of said barrel member with said first tube slidably mounted to said second tube, said second tube having a second slot and a second enlarged hole respectively defined through a peripheral wall thereof, said second enlarged hole communicating with said second slot;

a bar removably received in said second tube and having a firing pin extending from a first end thereof, a first spring having one of two ends thereof contacting a second end of said bar, a stepped hole defined laterally through said bar, a main spring mounted to said second tube and having one of two ends thereof contacting against said first tube, the other end of said first spring and said main spring being adapted to contact against an inner end of said dynamite gun;

a function rod movably received in said stepped hole and having a first section, a second section and a third section, wherein the outer diameter of said first section is larger than the width of said second slot and the inner diameter of said second enlarged hole, said width of said second slot is larger than the outer diameter of said second section, said outer diameter of said second section is larger than the width of said first slot, and said width of said first slot is larger than the outer diameter of said third section, said second section extending through said first enlarged hole and said second slot when said pushing rod is completely received in said barrel tube, and an actuating member pivotally disposed below said second tube and including a vertical portion and a horizontal portion, said horizontal portion having a first recess and a second recess respectively defined in a top thereof and separated by a protrusion.

2. The actuating device as claimed in claim 1 further comprising a sliding plate movably disposed to said top of said horizontal portion, said sliding plate having an elongate hole defined therethrough which communicates with said first recess, said protrusion having an inclined surface defined in one of two sides thereof.

3. The actuating device as claimed in claim 1, wherein said sliding plate has a tongue extending perpendicularly from one of two ends thereof so that a second spring is biased between said protrusion and said tongue.

4. The actuating device as claimed in claim 1, wherein said second tube has a third slot defined through said peripheral wall thereof and located diametrically opposite to said second slot so that an upper end of said function rod is allowed to movably extend through said third slot.

5. The actuating device as claimed in claim 1, wherein said first tube has a first inner groove and a second inner groove respectively defined in an inner periphery thereof, said first inner groove being located to communicate with said third slot as said first tube is mounted to said second tube.

6. The actuating device as claimed in claim 1, wherein said vertical portion of said actuating member is biased by a return spring to push said vertical portion in a direction away from said horizontal portion.

7. The actuating device as claimed in claim 1 further comprising a spring retained in said stepped hole and mounted to said function rod, a shoulder portion defined between said first enlarged hole and said first slot so that said second section of said function rod is engaged with said shoulder portion.

* * * * *